March 17, 1959     W. B. TANNER ET AL     2,878,168
PURIFICATION OF POLYVINYL ACETATE
Filed Dec. 21, 1955
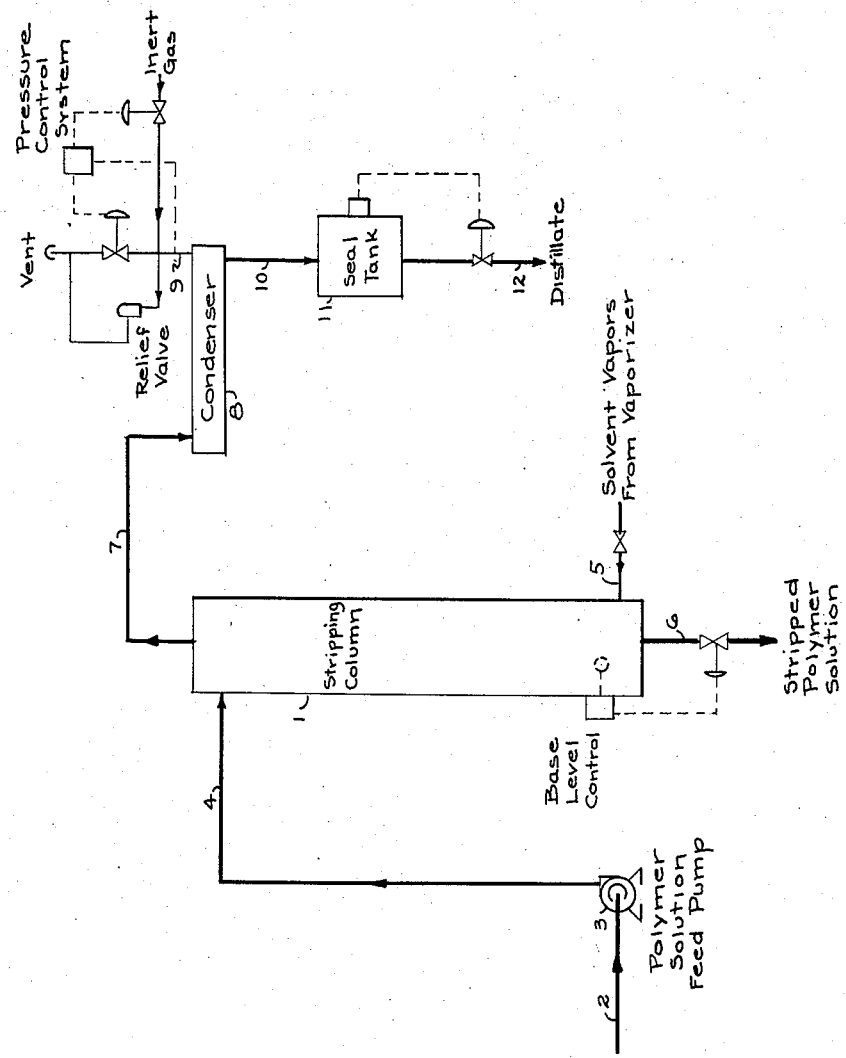
INVENTORS
Walton B. Tanner
John R. Wesel
BY
AGENT United States Patent Office 2,878,168
Patented Mar. 17, 1959

2,878,168

PURIFICATION OF POLYVINYL ACETATE

Walton B. Tanner, Grand Island, and John R. Wesel, Niagara Falls, N. Y., assignors to E. I. du Pont de Nemours and Company, Wilmington, Del., a corporation of Delaware Application December 21, 1955, Serial No. 554,569

7 Claims. (Cl. 202—46)

This invention relates to an improvement in the process for the production of polyvinyl acetate and specifically involves the purification of a polyvinyl acetate solution made by solution polymerization of vinyl acetate.

In the continuous homogeneous polymerization of vinyl acetate there is produced a solution of polyvinyl acetate in an alcohol, preferably methyl alcohol, contaminated by unpolymerized vinyl acetate monomer. For most purposes of further use the monomer must be removed from the polymer solution or at least greatly reduced. For reasons of economy it is also advisable to recover the contaminating monomer and again feed it to this polymerizer.

Polyvinyl acetate dissolved in a nonaqueous solvent such as alcohol produces a viscous solution and the viscosity varies with the concentration of the polymer and with the type of polymer molecule. Increasing the concontration results in increasing viscosity and increasing molecular weight of polymer and of polymer complexity also results in increasing viscosity of solutions containing comparable weights of polymer.

Separation of the monomer from polyvinyl acetate solutions can be effected by a stripping operation in a suitable distillation column. However, due to the high viscosity of the solution the rate of travel of the solution undergoing stripping is very low and hold-up time in the column tends to be excessive.

It is accordingly an object of this invention to provide an improved process for removing the unpolymerized vinyl acetate from the solutions of polyvinyl acetate. It is another object to provide a vinyl acetate stripping process for removing the monomer from the nonaqueous solution. A further object is to provide a method for conducting the stripping operation at a high temperature in order to decrease the viscosity of the polymer solution and thereby increase the capacity of the stripper still. It is a still further object to strip vinyl acetate from a polymer solution containing methyl alcohol solvent. A still further object is the removal of monomer from a solution of polymer in monomer by stripping with another solvent.

These and other objectives can be accomplished according to the present invention whereby a continuous stream of dissolved polyvinyl acetate containing unpolymerized vinyl acetate is fed to the top of a packed distilling tower operated under a pressure of at least twenty pounds but not in excess of about 200 pounds per square inch gauge or above atmospheric pressure. Methyl alcohol or other solvent vapors are forced into the lower part of the column and a vapor mixture of vinyl acetate and alcohol or other solvent are removed at the top of the column. Polyvinyl acetate solution stripped of vinyl acetate monomer is withdrawn from the bottom of the column.

We have now discovered that, contrary to expectations, as the pressure is increased in the stripping column with a consequent increase in temperature of operation there is no deleterious increase in undesirable by-products, such as e. g., acetaldehyde and acetic acid formation. Thus, operation under pressure permits raising the temperature at which the column functions and this in turn makes for a decrease in the viscosity of the solution undergoing stripping. Decrease in viscosity with increase in temperatures is considerable and this in turn permits a faster flow of the polyvinyl acetate solution down the column thus making for a large increase in stripping capacity per column of a given size. As an example of change in viscosity with temperature and pressure see Table I for a 38% solution of polyvinyl acetate in methanol. The polyvinyl acetate is a grade which on hydrolysis results in a polyvinyl alcohol having a relatively high viscosity corresponding to a commercial product known as "Elvanol" 72-60, being a grade of 99–100% hydrolyzed polyvinyl acetate and having a viscosity of 55–65 centipoises as determined for a 4% water solution at 20° C.

Table I

| Pressure, Lb./Sq. Inch Gauge | Temperature, °C. | Viscosity, centipoises |
|---|---|---|
| 0 | 64.5 | 108 |
| 12 | 80.0 | 58 |
| 30 | 95.0 | 33 |
| 45 | 105.0 | 22 |

It is, of course, necessary that no polymerization take place while the polyvinyl acetate-vinyl acetate solvent solution is in the stripper since this can result in deposition of polymer solids on exposed surfaces in the column with consequent plugging of the apparatus and cause a shutdown sooner or later with a certain loss of production and costly cleaning operation. To avoid this difficulty it is generally necessary to add an inhibitor to the solution before it enters the column to arrest any tendency to polymerization. A suitable inhibitor may be elemental sulfur, thiourea or oxides of nitrogen or any other agent having the desired inhibitory effect on the tendency of vinyl acetate to polymerize.

For the purpose of this invention the stripping operation for the removal of vinyl acetate from the polyvinyl acetate solution must be operated above atmospheric pressure but there is little advantage in operating above about 14 atmospheres. We prefer an operating pressure between about two and ten atmospheres.

The attached purely schematic drawing shows how the stripping column or still may be associated with other units for the purpose of removing unreacted monomer from a nonaqueous solution of polyvinyl acetate. Column 1 in which the stripping takes place is adapted to operate under pressure. The column will be provided with suitable plates or packing such as is useful in fractionation. Polymer solution enters the system at 2 by way of feed pump 3 and conduit 4 into the upper section of the stripper 1. Solvent vapor or stripping agent enters the column at 5 from a vaporizer not shown. Polyvinyl acetate stripped of vinyl acetate monomer leaves the stripping column at the bottom through 6 by way of a depressurizer not shown. Stripped vinyl acetate together with a varying proportion of solvent or stripping agent leaves at the top of the column as a vapor and enters condenser 8 by way of line 7. Pressure control and venting of noncondensibles takes place by way of exit 9 from the condenser through a train not described here. Distillate or condensed solvent vapors together with vinyl acetate is withdrawn by way of line 10 into a trap or seal tank device 11 and disposed from the system through 12, whereupon it may be fractionated for reuse of the vinyl monomer and the solvent or stripping agent as desired.

Methyl alcohol is the preferred solvent for polyvinyl acetate as well as the volatile stripping agent for the removal of vinyl acetate monomer in the polyvinyl acetate solution. However, other alcohols may be used for either or both purposes. There may be used any compatible organic solvent such as methyl alcohol, ethyl alcohol, the propyl alcohols and solvent ethers and esters as well as solvent hydrocarbons provided such solvents have boiling points below about 150° C. at atmospheric pressure. It is also contemplated that the polyvinyl acetate may be dissolved in its own monomer and that any other suitable solvent may be used as stripping agent to remove said monomer. As volatile stripping agents it is generally preferable to use the solvent in which the polyvinyl acetate is dissolved, however, any volatile organic solvent may be used such as methyl alcohol, ethyl alcohol, the propyl alcohols and volatile solvents such as ethers and esters and hydrocarbon solvents generally provided that they have suitable boiling points for the operating pressure and temperature of the stripper or distillation column in which the vinyl acetate is removed from the polyvinyl acetate solution. Furthermore, the stripping agents must be solvents not capable of forming polymers themselves or by interaction with vinyl acetate, and they should have boiling points below about 150° C. under atmospheric pressure. Alcohols suitable for use as either solvents for the polyvinyl acetate or as stripping agents for the removal of vinyl acetate should belong to the natural group of saturated alcohols having one to three carbon atoms.

We claim:

1. The process for stripping vinyl acetate from a solution comprising polyvinyl acetate, vinyl acetate and solvent for said polyvinyl acetate said solvent boiling below about 150° C., and being selected from the group consisting of methyl alcohol, ethyl alcohol, propyl alcohols and solvent ethers, esters, hydrocarbons and vinyl acetate, said process comprising passing said solution by gravity flow down a distilling column counter to upwardly passing vapor of unpolymerizable stripping agent selected from the group consisting of methyl alcohol, ethyl alcohol, propyl alcohols, ethers, esters, and hydrocarbons having boiling points below the internal temperature in said distilling column, removing a solution of polyvinyl acetate depleted of vinyl acetate from the lower part of said column, removing a vapor mixture containing vinyl acetate from the upper part of said column and maintaining a pressure between above about one atmosphere and below about 14 atmospheres in said column during said stripping process.

2. The process for stripping vinyl acetate from a solution comprising polyvinyl acetate, methyl alcohol and vinyl acetate comprising passing said solution by gravity flow down a distilling column counter to upwardly passing vapors of methyl alcohol in said column, removing a solution of polyvinyl acetate in methyl alcohol from the lower part of said column, removing a vapor mixture comprising vinyl acetate and methyl alcohol from the upper part of said column and maintaining a pressure between above about one atmosphere and below about 14 atmospheres in said column during said stripping process.

3. The process for stripping vinyl acetate from a solution comprising polyvinyl acetate, methyl alcohol and vinyl acetate comprising passing said solution by gravity flow down a packed distilling column counter to upwardly passing vapors of methyl alcohol in said column, introducing vapors of methyl alcohol into the lower part of said column, removing a solution of polyvinyl acetate in methyl alcohol from the lower part of said column, removing a vapor mixture comprising vinyl acetate and methyl alcohol from the upper part of said column and maintaining a pressure between above about one atmosphere and 14 atmospheres in said column during said stripping process.

4. The process for stripping vinyl acetate from a solution comprising polyvinyl acetate, methyl alcohol and vinyl acetate comprising passing said solution by gravity flow down a distilling column counter to upwardly passing vapors of methyl alcohol in said column, removing a solution of polyvinyl acetate in methyl alcohol from the lower part of said column, removing a vapor mixture comprising vinyl acetate and methyl alcohol from the upper part of said column and maintaining a pressure between about two atmospheres and 10 atmospheres in said column during said stripping process.

5. The process for stripping vinyl acetate from a solution comprising polyvinyl acetate, methyl alcohol and vinyl acetate comprising passing said solution by gravity flow down a packed distilling column counter to upwardly passing vapors of methyl alcohol in said column, introducing vapors of methyl alcohol into the lower part of said column, removing a solution of polyvinyl acetate in methyl alcohol from the lower part of said column, removing a vapor mixture comprising vinyl acetate and methyl alcohol from the upper part of said column and maintaining a pressure between above about one atmosphere and 14 atmospheres in said column during stripping operation.

6. In the process of removing vinyl acetate from anhydrous solution containing polyvinyl acetate, methyl alcohol, vinyl acetate and polymerization inhibitor the steps comprising passing said solution downwardly in a packed distilling column counter to upwardly passing vapors of methyl alcohol in said column, removing a mixture of vapors of vinyl acetate and methyl alcohol from the top of said column, removing polyvinyl acetate solution in methyl alcohol from the lower part of said column and the while maintaining the internal pressure of said column in excess of a pressure of two atmospheres but below about 200 pounds per square inch.

7. The process for stripping vinyl acetate from a nonaqueous polyvinyl acetate solution comprising passing said solution down a distilling column counter to upwardly passing vapors of a stripping agent, said stripping agent being a solvent for polyvinyl acetate and having a boiling point below 150° C., introducing vapors of said stripping agent into the lower part of said column, removing a solution of polyvinyl acetate in said stripping agent from the lower part of said column, removing a vapor mixture comprising vinyl acetate and stripping agent from the upper part of said column and maintaining a pressure above about one atmosphere and below about 14 atmospheres in said column during said stripping operation.

References Cited in the file of this patent

UNITED STATES PATENTS

| | | |
|---|---|---|
| 2,251,081 | Taylor et al. | July 29, 1941 |
| 2,500,894 | Craig | Mar. 14, 1950 |
| 2,555,939 | Sherwin | June 5, 1951 |
| 2,691,008 | Grim | Oct. 5, 1954 |

OTHER REFERENCES

Technique of Organic Chemistry, vol. IV, Distillation (Weissberger, ed.), published by Interscience Publishers, Inc. (New York), 1951 (page 338).